US005955693A

United States Patent [19]

Kageyama

[11] Patent Number: 5,955,693

[45] Date of Patent: Sep. 21, 1999

[54] KARAOKE APPARATUS MODIFYING LIVE SINGING VOICE BY MODEL VOICE

[75] Inventor: Yasuo Kageyama, Hamamatsu, Japan

[73] Assignee: Yamaha Corporation, Hamamatsu, Japan

[21] Appl. No.: 08/587,543

[22] Filed: Jan. 17, 1996

[30] Foreign Application Priority Data

Jan. 17, 1995 [JP] Japan .................................... 7-004849

[51] Int. Cl.[6] .............................. G09B 5/00; G10H 1/06; G10H 1/36

[52] U.S. Cl. ................................. 84/610; 84/622; 84/634

[58] Field of Search ..................... 84/601, 602, 609–614, 84/634–638, 645, 649–652, 666–669, 622–625; 395/2.16; 434/307 A

[56] References Cited

U.S. PATENT DOCUMENTS

| | | | |
|---|---|---|---|
| 4,731,847 | 3/1988 | Lybrook et al. . | |
| 5,235,124 | 8/1993 | Okamura et al. | 84/601 |
| 5,296,643 | 3/1994 | Kuo et al. | 84/610 |
| 5,428,708 | 6/1995 | Gibson et al. | 395/2.16 X |
| 5,446,238 | 8/1995 | Koyama et al. | 84/669 |
| 5,477,003 | 12/1995 | Muraki et al. | 84/610 |
| 5,518,408 | 5/1996 | Kawashima et al. | 84/609 X |

FOREIGN PATENT DOCUMENTS

| | | |
|---|---|---|
| 396141 | 11/1990 | European Pat. Off. . |
| 509812 | 10/1992 | European Pat. Off. . |
| 63-63100 | 3/1988 | Japan . |
| 63-300297 | 12/1988 | Japan . |
| 4-107298 | 9/1992 | Japan . |
| 8805200 | 7/1988 | WIPO . |

*Primary Examiner*—Stanley J. Witkowski
*Attorney, Agent, or Firm*—Pillsbury Madison & Sutro LLP

[57] ABSTRACT

A karaoke apparatus produces a karaoke accompaniment which accompanies a singing voice of a player. A memory device stores primary characteristics of a model vowel contained in a model voice. An input device collects an input singing voice of the player containing a pair of a lead consonant component and a subsequent vowel component. A separating device separates the lead consonant component and the subsequent vowel component from each other. An extracting device extracts secondary characteristics of the subsequent vowel component separated from the lead consonant component. A creating device creates a substitutive vowel component according to the primary characteristics and the secondary characteristics so that the separated subsequent vowel component is converted into the substitutive vowel component while modified by the model vowel. A synthesizing device combines the separated lead consonant component with the substitutive vowel component in place of the separated subsequent vowel component to synthesize an output singing voice of the player. An output device produces the output singing voice together with the karaoke accompaniment.

12 Claims, 7 Drawing Sheets

KARAOKE APPARATUS MODIFYING LIVE SINGING VOICE BY MODEL VOICE

BACKGROUND OF THE INVENTION

The present invention relates to a karaoke apparatus and more particularly to a karaoke apparatus capable of changing a live singing voice to a similar voice of an original singer of a karaoke song.

There has been proposed a karaoke apparatus that can variably process a live singing voice to make a karaoke player sing joyful, or sing better. In such a karaoke apparatus, there is known a voice converter device to alter the singing voice drastically to make the voice queer or funny. Further, a sophisticated karaoke apparatus can create a chorus voice having a three-step higher pitch from the singing voice to make harmony, for instance.

Karaoke players desire that they would sing like a professional singer (original singer) of an entry karaoke song. However, in the conventional karaoke apparatus, it was not possible to convert the voice of the karaoke player to a model voice of the professional singer.

SUMMARY OF THE INVENTION

The object of the present invention is to provide a karaoke apparatus by which a karaoke player can sing in a modified voice like the original singer of the karaoke song.

In a general form, the inventive karaoke apparatus for producing a karaoke accompaniment which accompanies the singing voice of a player, comprises a memory device that stores primary characteristics of the model voice, an input device that collects an input singing voice of the player, an analyzing device that analyzes the input singing voice to extract therefrom secondary characteristics, a synthesizing device that synthesizes an output singing voice of the player according to the primary characteristics and the secondary characteristics so that the input singing voice is converted into the output singing voice while modified by the model voice, and an output device that produces the output singing voice together with the karaoke accompaniment.

In a specific form, the inventive karaoke apparatus for producing a karaoke accompaniment which accompanies the singing voice of a player, comprises a memory device that stores primary characteristics of a model vowel contained in a model voice, an input device that collects the input singing voice of the player containing a pair of a lead consonant component and a subsequent vowel component, a separating device that separates the lead consonant component and the subsequent vowel component from each other, an extracting device that extracts secondary characteristics of the subsequent vowel component separated from the lead consonant component, a creating device that creates a substitutive vowel component according to the primary characteristics and the secondary characteristics so that the separated subsequent vowel component is converted into the substitutive vowel component while modified by the model vowel, a synthesizing device that combines the separated lead consonant component with the substitutive vowel component in place of the separated subsequent vowel component to synthesize an output singing voice of the player, and an output device that produces the output singing voice together with the karaoke accompaniment.

In a preferred form, the memory device stores the primary characteristics in terms of a waveform of the model vowel while the extracting device extracts the second characteristics in terms of a pitch of the separated subsequent vowel component so that the creating device creates the substitutive vowel component which has the waveform of the model vowel and the pitch of the separated subsequent vowel component.

In another preferred form, the input device successively collects syllables of the input singing voice and the separating device separates each syllable into the lead consonant component and the subsequent vowel component so that the synthesizing device successively synthesizes syllables of the output singing voice corresponding to the syllables of the input singing voice.

In a further preferred form, the memory device stores the primary characteristics of a plurality of model vowels in the form of sequential data in correspondence with a sequence of syllables of the singing voice so that the creating device can create the substitutive vowel component of each syllable in synchronization with progression of the input singing voice.

The karaoke apparatus according to the present invention stores primary characteristics of the model voice of a particular person such as the original singer of the karaoke song in the characteristics memory device. The model voice can be sampled from an actual singing voice. As the live singing voice is fed to the input device, the analyzing device analyzes the input singing voice, and the output singing voice having the primary characteristics stored in the memory device is generated on the basis of the result of the analysis. Reproducing the output singing voice makes the karaoke player sing as if he or she is the particular person or the original singer. In detail, the karaoke apparatus according to the present invention extracts and stores the primary characteristics of a model vowel contained in the voice of the particular person. As the input singing voice of the karaoke player is fed in, a succeeding vowel and a preceding consonant of each syllable of the input singing voice are separated from each other. Then, at least pitch information is extracted as the secondary characteristics from the separated vowel, and a substitutive vowel is generated based on the extracted pitch information. The generated vowel and the separated consonant are coupled to each other to reconstruct a final output singing voice. The final singing voice maintains the secondary characteristics of the singing manner of the karaoke player in terms of the consonant, and has the primary characteristics of the tone of the original singer of the karaoke song. Thus, the karaoke player can sing as if he or she has the voice of the particular model person in karaoke singing. With storing the vowel characteristics derived from syllable-to-syllable analysis of the model voice of the particular person who sings the original karaoke song in the characteristics memory device, and by generating the substitutive vowel from the stored vowel characteristics, the karaoke player can simulate the singing voice of the particular model person in the karaoke song. If such a syllable-to-syllable analysis is employed, a prompting device can be utilized to indicate a corresponding syllable in synchronism with the progression of the karaoke performance.

DETAILED DESCRIPTION OF THE INVENTION

Figure 1:
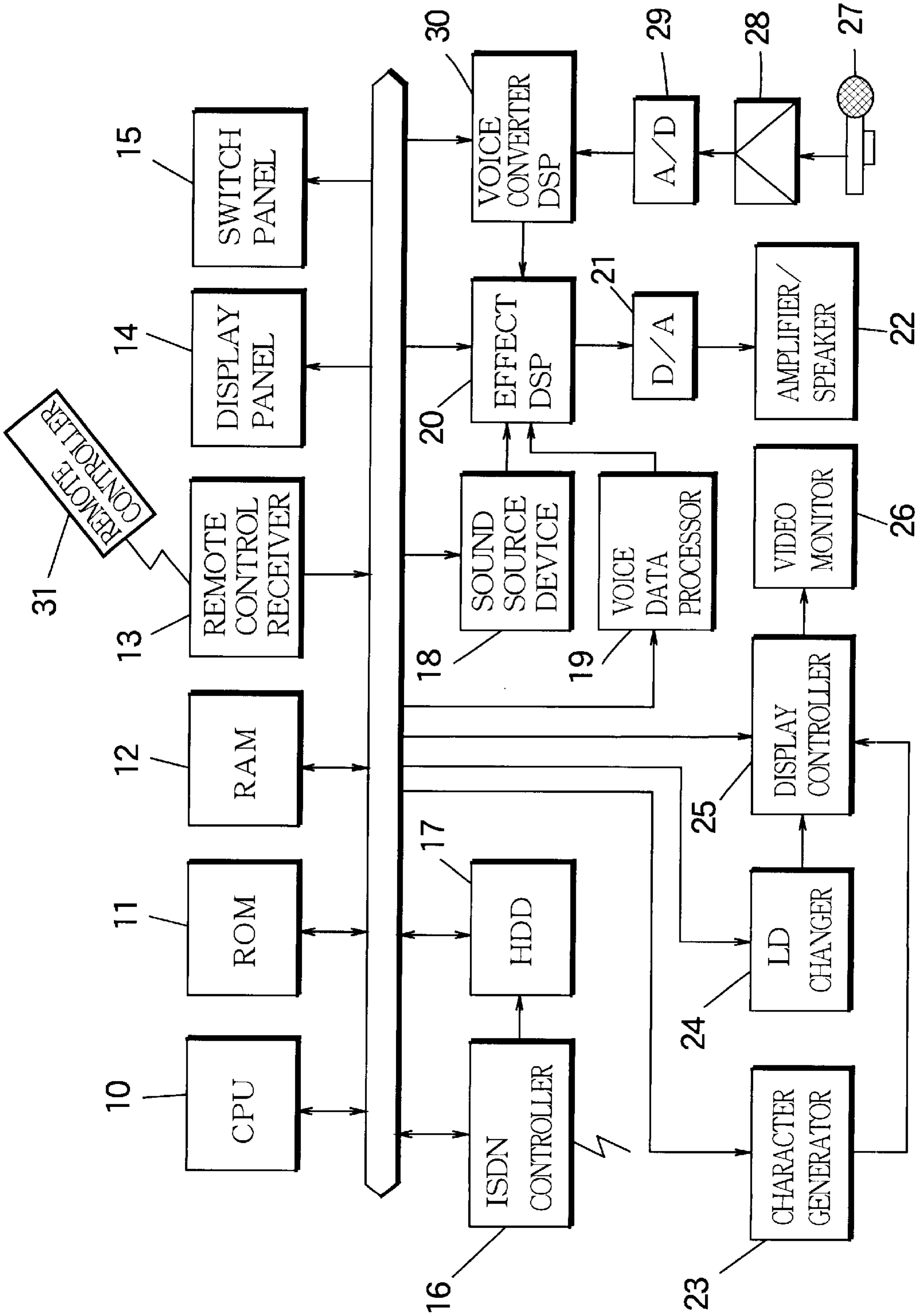
FIG. 1 is a block schematic diagram showing a voice converting karaoke apparatus according to the present invention.

Details of embodiments of the karaoke apparatus having voice converting function according to the present invention will now be described with reference to the figures. The karaoke apparatus of the invention is called a sound source karaoke apparatus. The sound source karaoke apparatus generates accompanying instrumental sounds by driving a sound source according to song data. Further, the karaoke apparatus of the invention is structured as a network communication karaoke device, which connects to a host station through communication network. The karaoke apparatus receives song data downloaded from the host station, and stores the song data in a hard disk drive (HDD) 17 (FIG. 1). The hard disk drive 17 can store several hundreds to several thousands of the song data. The voice converting function of the present invention is not to output the karaoke player's singing voice as it is, but to convert it to a different tone, for instance, of an original singer, and thus special information to enable such a voice conversion is stored in association with the song data in the hard disk drive 17.

Figure 3:
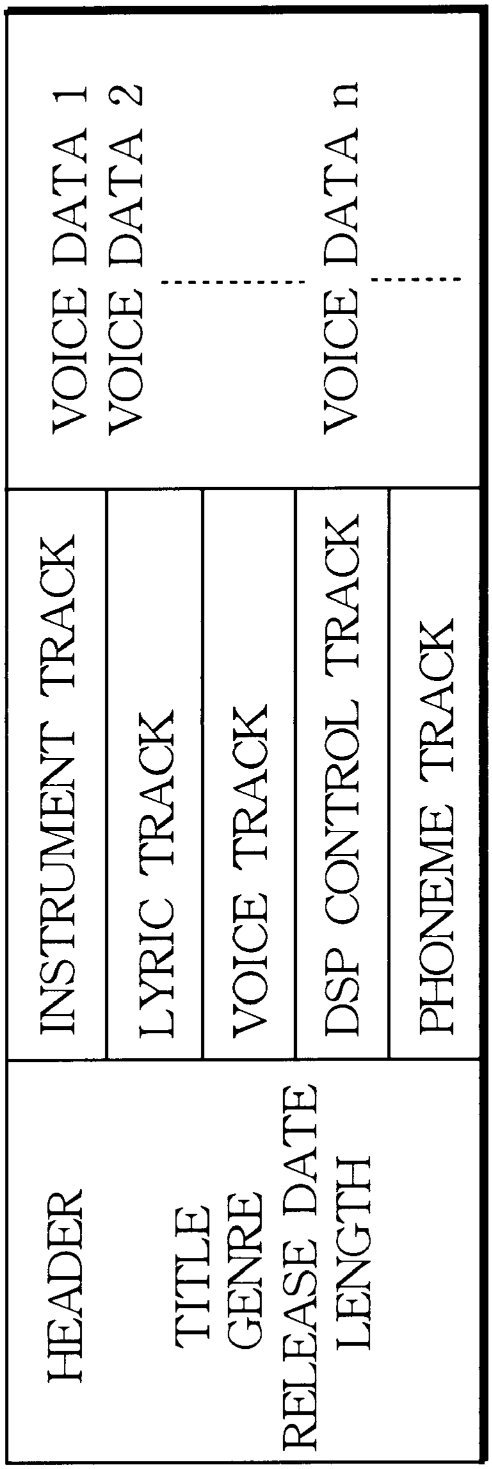
FIG. 3 shows the configuration of the song data utilized in the karaoke apparatus.
Figure 4:
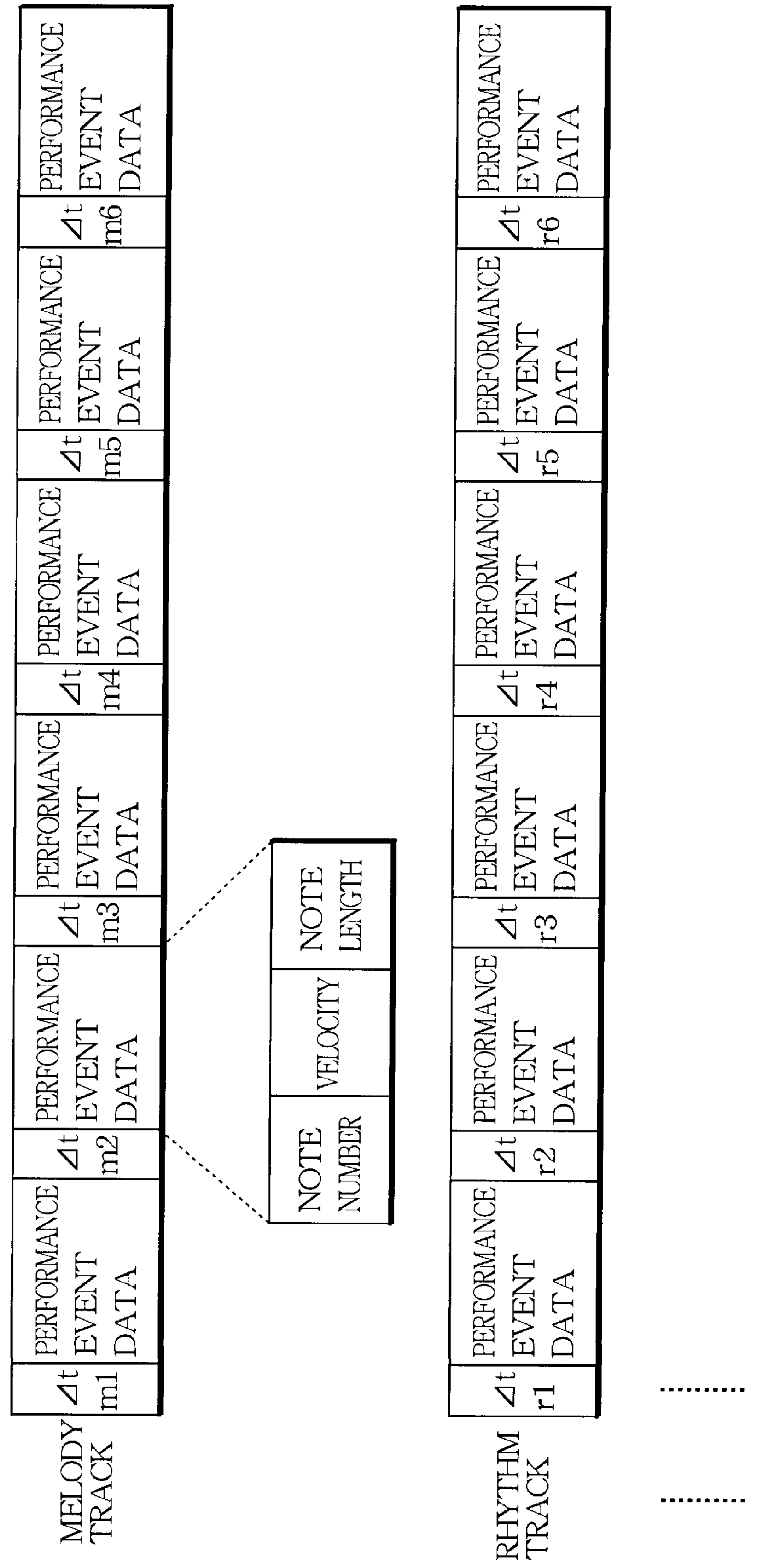
FIG. 4 shows the configuration of the song data utilized in the karaoke apparatus.
Figure 5A:
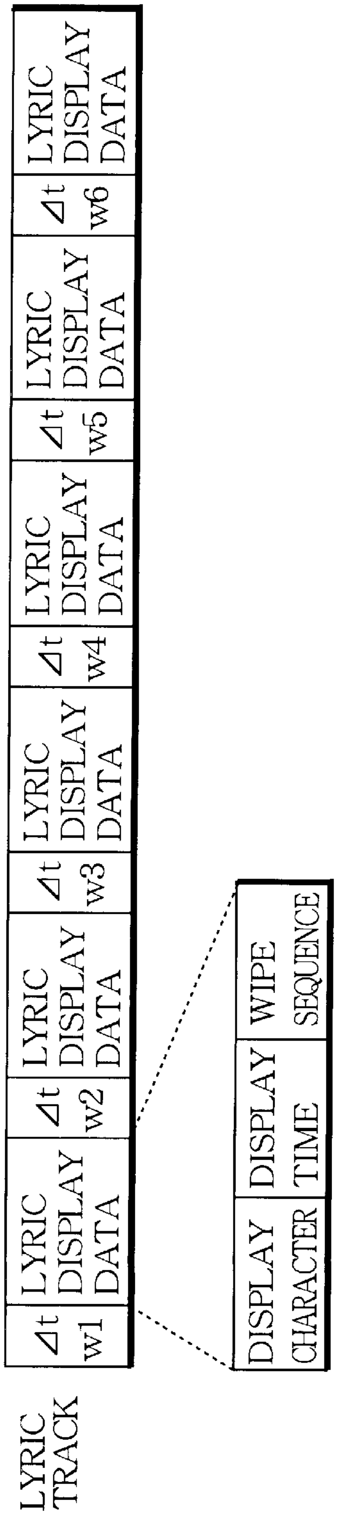
FIGS. 5A–5D show the configuration of the song data utilized in the karaoke apparatus.
Figure 5B:
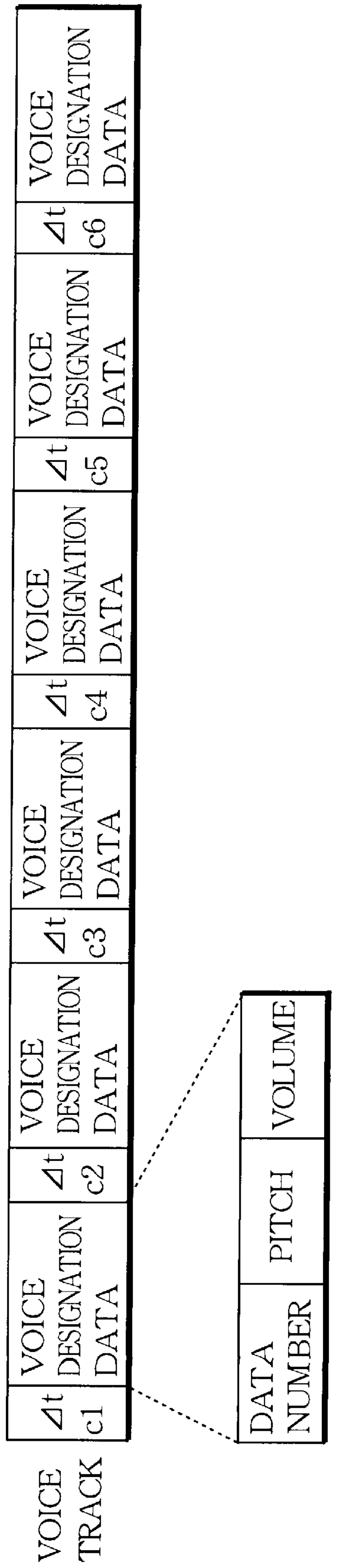
Figure 5C:
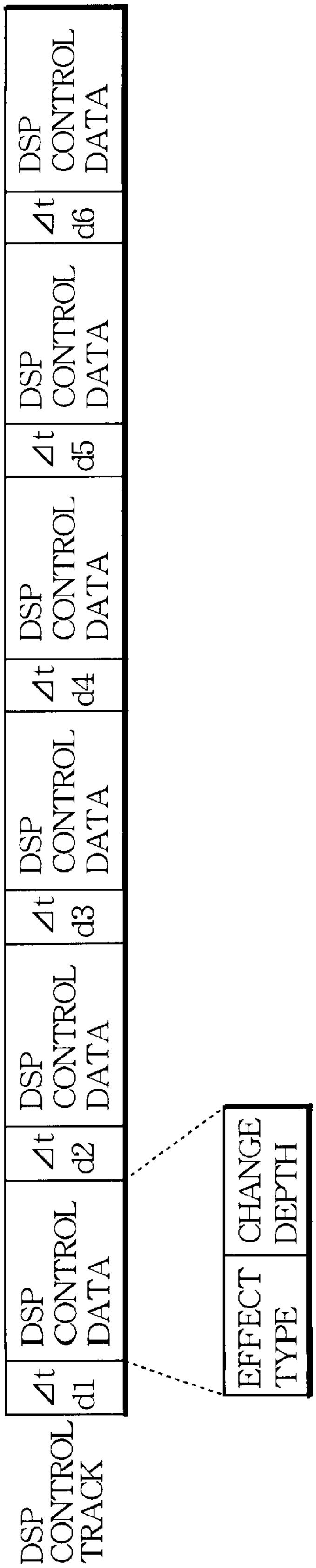
Figure 5D:
Figure 6A:
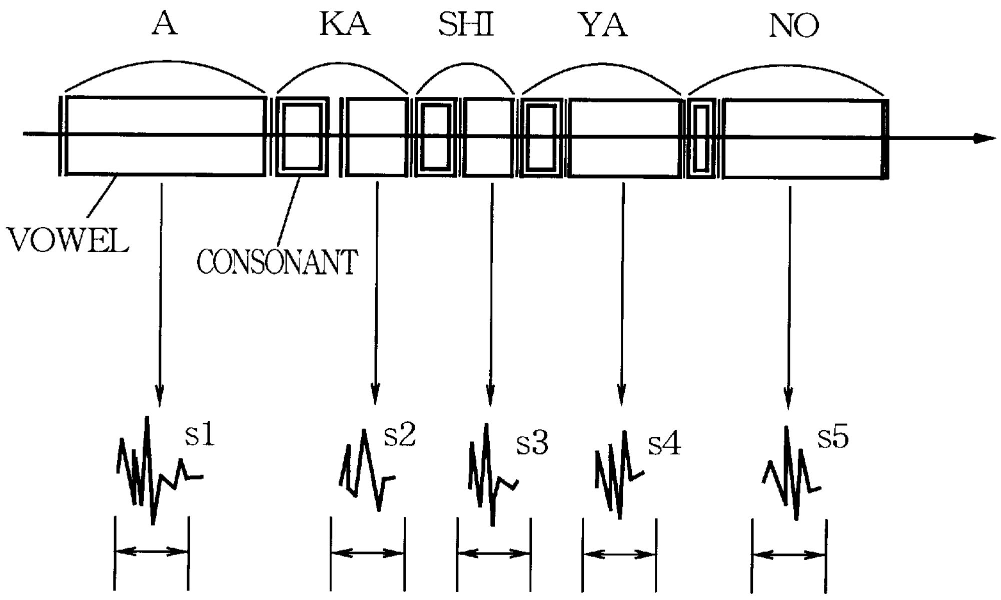
FIGS. 6A and 6B show the configuration of the phoneme data included in the song data.
Figure 6B:
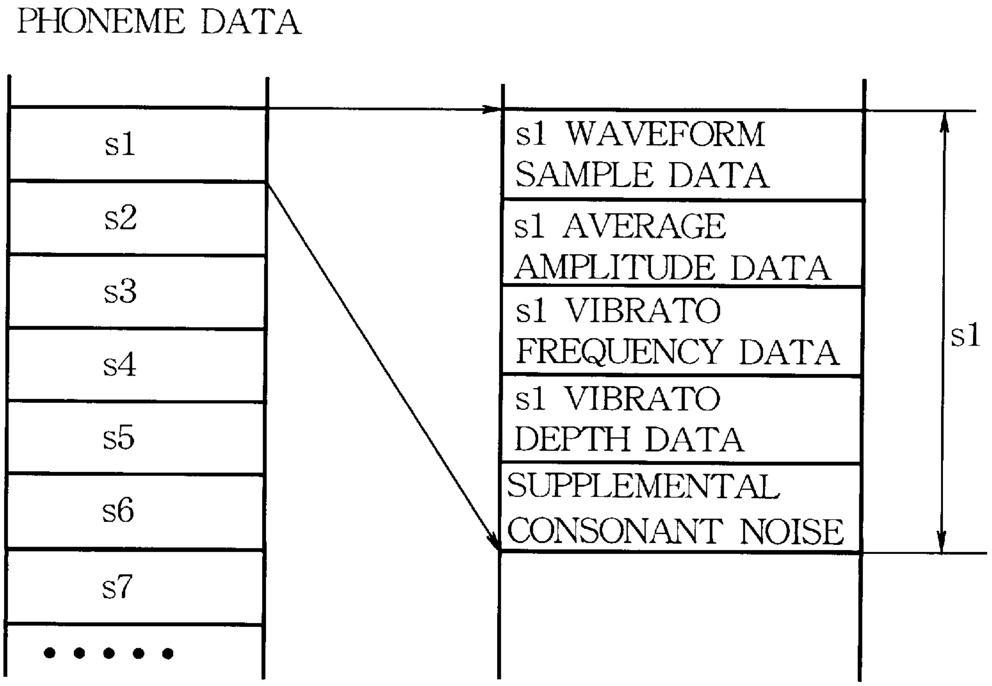

Now the configuration of the song data used in the karaoke apparatus of the present invention is described referring FIGS. 3 to 6B. FIG. 3 shows the overall configuration of the song data, FIGS. 4 and 5A–5D show the detailed configuration of the song data, and FIGS. 6A and 6B show the structure of phoneme data included in the song data.

In FIG. 3, the song data of one piece comprises a header, an instrumental sound track, a lyric track, a voice track, a DSP control track, a phoneme track, and a voice data block. The header contains various index data relating to the song data, including the title of the song, the genre of the song, the date of the release of the song, the performance time (length) of the song and so on. A CPU 10 (FIG. 1) determines a background video image to be displayed on a video monitor 26 based on the genre data, and sends a chapter number of the video image to a LD changer 24. The background video image can be selected such that a video image of a snowy country is chosen for a Japanese ballad song having a theme relating to winter season, or a video image of foreign scenery is selected for foreign pop songs.

The instrumental sound track shown in FIG. 4 contains various instrument tracks including a melody track, a rhythm track and so on. Sequence data composed of performance event data and duration data Δt is written on each track. The CPU 10 executes an instrumental sequence program while counting the duration data Δt, and sends next event data to a sound source device 18 at an output timing of the event data. The sound source device 18 selects a tone generation channel according to channel specifying data included in the event data, and executes the event at the specified channel so as to generate an instrumental accompaniment of the karaoke song.

As shown in FIG. 5A, the lyric track records a sequence data to display lyrics on the video monitor 26. This sequence data is not actually instrumental sound data, but this track is described also in MIDI data format for easily integrating the data implementation. The class of data is system exclusive message in MIDI standard. In the data description of the lyric track, a phrase of lyric is treated as one event of lyric display data. The lyric display data comprises character codes for the phrase of the lyric, the display coordinate of each character, the display time of the lyric phrase (about 30 seconds in typical applications), and "wipe" sequence data. The "wipe" sequence data is to change the color of each character in the displayed lyric phrase in relation to the progress of the song. The wipe sequence data comprises timing data (the time since the lyric is displayed) and position (coordinate) data of each character for the change of color.

As shown in FIG. 5B, the voice track is a sequence track to control generation timing of the voice data n (n=1, 2, 3 . . .) stored in the voice data block. The voice data block stores human voices hard to synthesize by the sound source device 18, such as backing chorus, or harmony voices. On the voice track, there is written the duration data Δt, namely the read-out interval of each voice designation data. The duration data Δt determines timing to output the voice data to a voice data processor 19 (FIG. 1). The voice designation data comprises a voice number, pitch data and volume data. The voice number is a code number n to identify a desired item of the voice data recorded in the voice data block. The pitch and the volume data respectively specify the pitch and the volume of the voice data to be generated. Non-verbal backing chorus such as "Ahh" or "Wahwahwah" can be variably reproduced as many times as desired with changing the pitch and volume. Such a part is reproduced by shifting the pitch or adjusting the volume magnitude of a voice data registered in the voice data block. The voice data processor 19 controls an output level based on the volume data, and regulating the pitch by changing read-out interval of the voice data based on the pitch data.

As shown in FIG. 5C, the DSP control track stores control data for an effector DSP 20 connected next to the sound source device 18 and to the voice data processor 19. The main purpose of the effector DSP 20 is adding various sound effects such as reverberation ('reverb'). The DSP 20 controls the effect on real time base according to the control data which is recorded on the DSP control track and which specifies the type and depth of the effect.

As shown in FIG. 5D, the phoneme track stores phoneme data s1, s2, . . . in time series, and duration data e1, e2, . . . representing the length of a syllable to which each phoneme belongs. The phoneme data s1, s2, s3, . . . and the duration data e1, e2, e3 . . . are alternately arranged to each other to form a sequential data format. While the most tracks from the instrumental sound track to the DSP control track are loaded into a RAM 12 from the hard disk drive 17, the CPU 10 reads out the data of these tracks at the beginning of the reproduction of the song data. However, the phoneme track is directly loaded into another RAM included in a voice converting DSP 30 from the hard disk drive 17. The voice converting DSP 30 reads out the phoneme data in synchronism with the other data.

In FIG. 6A, a phrase of lyric 'A KA SHI YA NO' comprises five syllables 'A', 'KA', 'SHI', 'YA', 'NO', and phoneme data s1, s2, . . . are composed of extracted vowels 'a', 'a', 'i', 'a', 'o' from the five syllables. As shown in FIG. 6B, the phoneme data comprises sample waveform data encoded from a vowel waveform of a model voice, average magnitude (amplitude) data, vibrato frequency data, vibrato depth data, and supplemental noise data. The supplemental noise data represents characteristics of aperiodic noise contained in the model vowel. The phoneme data represents primary characteristics of the vowels contained in the model voice, in terms of the waveform, envelope thereof, vibrato frequency, vibrato depth and supplemental noise.

FIG. 1 shows a schematic block diagram of the inventive karaoke apparatus having the voice conversion function. The CPU 10 to control the whole system is connected, through a system bus, to those of a ROM 11, a RAM 12, the hard disk drive (denoted as HDD) 17, an ISDN controller 16, a remote control receiver 13, a display panel 14, a switch panel 15, the sound source device 18, the voice data processor 19, the effect DSP 20, a character generator 23, the LD changer 24, a display controller 25, and the voice converter DSP 30.

The ROM 11 stores a system program, an application program, a loader program and font data. The system program controls basic operation, and data transfer between peripherals and so on. The application program includes a peripheral device controller, a sequence control program and so on. The sequence program includes a main sequence program, an instrument sound sequence program, a character sequence program, a voice sequence program, a DSP sequence program and so on. In karaoke performance, each sequence program is processed by the CPU 10 in a parallel manner to reproduce all instrumental accompaniment sound and a background video image according to the song data. The loader program is executed to download requested song data from the host station. The font data is used to display lyrics and song titles, and various fonts such as 'Mincho', 'Gothic', etc. are stored as the font data. A work area is allocated in the RAM 12. The hard disk drive 17 stores song data files.

The ISDN controller 16 controls the data communication with the host station through ISDN network. The various data including the song data are downloaded from the host station. The ISDN controller 16 accommodates a DMA controller, which writes data such as the downloaded song data and the application program directly into the HDD 17 without control by the CPU 10.

The remote control receiver 13 receives an infrared signal modulated with control data from a remote controller 31, and decodes the received data. The remote controller 31 is provided with ten key switches, command switches such as a song selector switch and so on, and transmits the infrared signal modulated by codes corresponding to the user's operation of the switches. The switch panel 15 is provided on the front face of the karaoke apparatus, and includes a song code input switch, a singing key changer switch and so on.

The sound source device 18 generates the instrumental accompaniment sound according to the song data. The voice data processor 19 generates a voice signal having a specified length and pitch corresponding to voice data included as ADPCM data in the song data. The voice data is a digital waveform data representative of backing chorus or exemplary singing voice, which is hard to synthesize by the sound source device 18, and therefore which is digitally encoded as it is. The instrumental accompaniment sound signal generated by the sound source device 18, the chorus voice signal generated by the voice data processor 19, and the singing voice signal generated by the voice converter DSP 30 are concurrently fed to the sound effect DSP 20. The effect DSP 20 adds various sound effects, such as echo and reverb to the instrumental sound and voice signals. The type and depth of the sound effects added by the effect DSP 20 is controlled based on the DSP control data included in the song data. The DSP control data is fed to the effect DSP 20 at predetermined timings, according to the DSP control sequence program under the control by the CPU 10. The effect-added instrumental sound signal and the singing voice signal are converted into an analog audio signal by a D/A converter 21, and then fed to an amplifier/speaker 22. The amplifier/speaker 22 constitutes an output device, and amplifies and reproduces the audio signal.

A microphone 27 constitutes an input device and collects or picks up a singing voice signal, which is fed to the voice converter DSP 30 through a pre-amplifier 28 and an A/D converter 29. The DSP 30 converts each vowel component of the singing voice signal into a substitutive vowel component which is created according to a vowel waveform of a model person such as an original singer. The converted signal is put into the sound effect DSP 20.

The character generator 23 generates character patterns representative of a song title and lyrics corresponding to the input character code data. The LD changer 24 reproduces a background video image corresponding to the input video image selection data (chapter number). The video image selection data is determined based on the genre data of the karaoke song, for instance. As the karaoke performance is started, the CPU 10 reads the genre data recorded in the header of the song data. The CPU 10 determines a background video image to be displayed corresponding to the genre data and contents of the background video image. The CPU 10 sends the video image selection data to the LD changer 24. The LD changer 24 accommodates five laser discs containing 120 scenes, and can selectively reproduce 120 scenes of the background video image. According to the image selection data, one of the background video images is chosen to be displayed. The character data and the video image data are fed to the display controller 25, which superimposes them with each other and displays on the video monitor 26.

Figure 2:
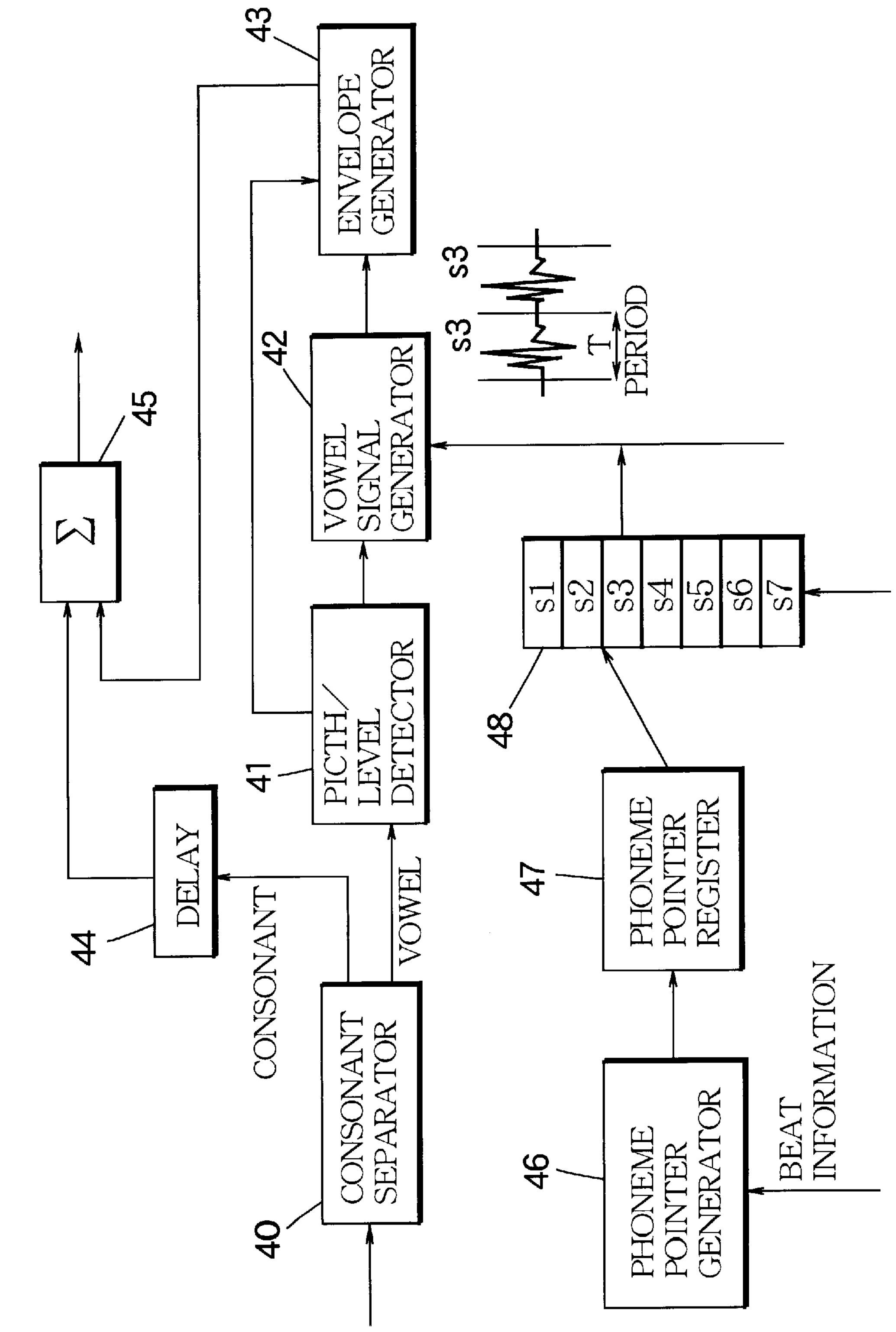
FIG. 2 shows the structure of the voice converter DSP provided in the karaoke apparatus.

FIG. 2 shows the detailed structure of the voice converter DSP 30. The phoneme data representative of the primary characteristics of the model voice is fed to a phoneme data register 48 which constitutes a memory device. On the other hand, the duration data is fed to a phoneme pointer generator 46 from the HDD 17. The phoneme data s1, s2. . . and the duration data e1, e2, . . . included in the phoneme data track are entered in the sequential order to the phoneme data register 48 and the phoneme pointer generator 46, respectively. As the karaoke performance is started, the phoneme pointer generator 46 is provided with beat information such as tempo clocks which time and control the progression of the karaoke song. The phoneme pointer generator 46 counts the duration data in synchronism with the beat information to decide which syllable of the lyric is to be sung, and generates an address pointer to designate the phoneme data which corresponds to the decided syllable, in terms of an address of the register 48 where the corresponding phoneme data is stored. The generated address pointer is stored in a phoneme pointer register 47. When a vowel signal generator 42 (described below) accesses the phoneme data register 48, the phoneme data pointed by the phoneme pointer register 47 is read out.

A consonant separator 40 accepts a digitized input singing voice signal collected through the microphone 27, the pre-amplifier 28, and the A/D converter 29. The consonant separator 40 separates a leading consonant component and a subsequent vowel component of each syllable contained in the digitized input singing voice signal. The separator 40 feeds the consonant component to a delay 44, and feeds the vowel component to a pitch/level detector 41. The consonant and vowel components can be separated from each other, for instance, by detecting a difference in a fundamental frequency or a waveform. The pitch/level detector 41 constitutes an analyzing device to analyze the input singing voice signal to extract therefrom secondary characteristics. Namely, the detector 41 detects the pitch (frequency) and the level of the input vowel component. The detection is executed in real time basis, and the detected information relating to changes of the pitch and the level in time series are fed as the secondary characteristics to the vowel signal generator 42 and an envelope generator 43, respectively. The vowel signal generator 42 receives the phoneme data pointed by the phoneme pointer from the phoneme data register 48 in synchronism with the song progression. The vowel signal generator 42 creates or generates a substitutive vowel signal according to the phoneme data at the pitch specified by the pitch/level detector 41. The substitutive vowel signal created by the vowel signal generator 42 is fed to the envelope generator 43. The envelope generator 43 accepts the level information of the separated vowel component in real time, and controls the level of the substitutive vowel signal received from the vowel signal generator 42 in response to the level information. The substitutive vowel signal added with the envelope according to the level information is fed to an adder 45.

On the other hand, the delay 44 delays the separated consonant signal from the consonant separator 40 as long as the vowel processing time in a loop including the pitch/level detector 41, the vowel signal generator 42 and the envelope generator 43. The delayed consonant signal is put into the adder 45. The adder 45 partly constitutes a synthesizing device to synthesize an output singing voice signal by combining the consonant component separated from the input singing voice of the karaoke player with the substitutive vowel component which is derived from the original singer and which is modified according to the pitch and level information extracted from the separated vowel component of the karaoke player. Thus, the synthesized final output singing voice maintains the secondary characteristics of the karaoke player in the consonant part, and also characteristics of the model singer in the vowel part. The generated singing voice is fed to the effect DSP 20.

The voice converter DSP 30 operates as described above, and enables the karaoke player to sing in an artificial voice similar to the original model singer while keeping his manner of singing in a consonant part.

For summary, the inventive karaoke apparatus produces a karaoke accompaniment which accompanies a singing voice of a player. In the apparatus, the memory device stores primary characteristics of a model voice. The input device collects an input singing voice of the player. The analyzing device analyzes the input singing voice to extract therefrom secondary characteristics. The synthesizing device synthesizes the output singing voice of the player according to the primary characteristics and the secondary characteristics so that the input singing voice is converted into the output singing voice while modified by the model voice. The output device produces the output singing voice together with the karaoke accompaniment. Specifically, the memory device stores the primary characteristics in terms of a waveform of the model voice while the analyzing device extracts the secondary characteristics in terms of at least one of a pitch and an envelope of the input singing voice so that the synthesizing device synthesizes the output singing voice which has the waveform of the model voice and at least one of the pitch and the envelope of the input singing voice. Further, the memory device stores the primary characteristics representative of a vowel contained in the model voice while the analyzing device extracts the secondary characteristics representative of a consonant contained in the input singing voice so that the synthesizing device synthesizes the output singing voice which contains the vowel originating from the model voice and the consonant originating from the input singing voice. Moreover, the memory device stores the primary characteristics of each of syllables sequentially sampled from the model voice which is sung by a model singer, while the analyzing device extracts the secondary characteristics of each of syllables sequentially sampled from the input singing voice of the player so that the synthesizing device synthesizes the output singing voice syllable by syllable.

In the description above, the envelope generator 43 controls the envelope of the created vowel signal in response to the separated vowel signal level of the karaoke player's voice. Otherwise, the generator 43 may be structured to add a predetermined and fixed envelope. In the embodiment above, the model vowel extracted from the original song is stored in the form of phoneme data. However, the phoneme data to be stored is not limited to that extent. For example, typical pronunciations in Japanese standard syllabary may be stored for use in determining phoneme data and synthesizing a vowel by analyzing the karaoke input singing voice.

As described in the foregoing, according to the present invention, synthesizing of the singing voice signal of a particular person such as an original singer based on a live voice signal of the karaoke player enables reproducing of the original singer's voice in response to the karaoke player's voice, so that the karaoke player can enjoy singing as if the original singer is singing. Further, it is possible to maintain the karaoke player's manner of singing by mixing vowels of the karaoke player and the original singer to reconstruct the singing voice signal, so that the karaoke player's tone is replaced by the tone of the original singer.

What is claimed is:

1. A karaoke apparatus for producing a karaoke accompaniment which accompanies a singing voice of a player, the apparatus comprising:

a memory device that stores primary characteristics of a model voice;

an input device that collects an input singing voice of the player;

an analyzing device that analyzes the input singing voice to extract therefrom secondary characteristics;

a synthesizing device that synthesizes an output singing voice of the player by modifying the primary characteristics of the model voice in accordance with the secondary characteristics of the input singing voice to create a modified voice and by replacing a portion of the input singing voice with the modified voice to thereby synthesize the output singing voice; and an output device that produces the output singing voice together with the karaoke accompaniment.

2. A karaoke apparatus according to claim 1, wherein the memory device stores the primary characteristics in terms of a waveform of the model voice while the analyzing device extracts the secondary characteristics in terms of at least one of a pitch and an envelope of the input singing voice so that the synthesizing device synthesizes the output singing voice which has the waveform of the model voice and at least one of the pitch and the envelope of the input singing voice.

3. A karaoke apparatus according to claim 1, wherein the memory device stores the primary characteristics representative of a vowel contained in the model voice while the analyzing device extracts a consonant contained in the input singing voice so that the synthesizing device synthesizes the output singing voice which contains the vowel originating from the model voice and the consonant originating from the input singing voice.

4. A karaoke apparatus according to claim 1, wherein the memory device stores the primary characteristics of each of syllables sequentially sampled from the model voice which is sung by a model singer while the analyzing device extracts the secondary characteristics of each of syllables sequentially sampled from the input singing voice of the player so that the synthesizing device synthesizes the output singing voice a syllable by syllable.

5. A karaoke apparatus for producing a karaoke accompaniment which accompanies a singing voice of a player, the apparatus comprising:

a memory device that stores primary characteristics of a model vowel contained in a model voice;

an input device that collects an input singing voice of the player containing a pair of a lead consonant component and a subsequent vowel component;

a separating device that separates the lead consonant component and the subsequent vowel component from each other;

an extracting device that extracts secondary characteristics of the subsequent vowel component separated from the lead consonant component;

a creating device that creates a substitutive vowel component according to the primary characteristics and the secondary characteristics so that the separated subsequent vowel component is converted into the substitutive vowel component by being modified by the model vowel;

a synthesizing device that combines the separated lead consonant component with the substitutive vowel component in place of the separated subsequent vowel component to synthesize an output singing voice of the player; and an output device that produces the output singing voice together with the karaoke accompaniment.

6. A karaoke apparatus according to claim 5, wherein the memory device stores the primary characteristics in terms of a waveform of the model voice while the extracting device extracts the secondary characteristics in terms of a pitch of the separated subsequent vowel component so that the creating device creates the substitutive vowel component which has the waveform of the model voice and the pitch of the separated subsequent vowel component.

7. A karaoke apparatus according to claim 5, wherein the input device successively collects syllables of the input singing voice and the separating device separates each syllable into the lead consonant component and the subsequent vowel component so that the synthesizing device successively synthesizes syllables of the output singing voice corresponding to the syllables of the input singing voice.

8. A karaoke apparatus according to claim 7, wherein the memory device stores the primary characteristics of a plurality of model vowels in the form of sequential data in correspondence with a sequence of syllables of the singing voice so that the creating device can create the substitutive vowel component of each syllable in synchronization with a progression of the input singing voice.

9. A method of producing an output singing voice with a karaoke accompaniment, the method comprising:

storing primary characteristics of a model vowel contained in a model voice;

collecting an input singing voice of a player containing a pair of a lead consonant component and a subsequent vowel component;

separating the lead consonant component and the subsequent vowel component from each other;

extracting secondary characteristics of the subsequent vowel component separated from the lead consonant component;

creating a substitutive vowel component according to the primary characteristics and the secondary characteristics so that the separated subsequent vowel component is converted into the substitutive vowel component by being modified by the model vowel;

combining the separated lead consonant component with the substitutive vowel component in place of the separated subsequent vowel component to synthesize an output singing voice of the player; and producing the output singing voice together with the karaoke accompaniment.

10. The method of claim 9, further comprising the steps of:

storing the primary characteristics in terms of a waveform of the model voice;

extracting the secondary characteristics in terms of a pitch of the separated subsequent vowel component; and creating the substitutive vowel component which has the waveform of the model voice and the pitch of the separated subsequent vowel component.

11. The method of claim 9, further comprising the steps of:

successively collecting syllables of the input singing voice;

separating each syllable into the lead consonant component and the subsequent vowel component; and successively synthesizing syllables of the output singing voice corresponding to the syllables of the input singing voice.

12. The method of claim 11, further comprising the steps of:

storing the primary characteristics of a plurality of model vowels in the form of sequential data in correspondence with a sequence of syllables of the singing voice; and creating the substitutive vowel component of each syllable in synchronization with progression of the input singing voice.

* * * * *